United States Patent [19]
Lumpe et al.

[11] Patent Number: 5,893,499
[45] Date of Patent: Apr. 13, 1999

[54] MOUNTING SUPPORT FOR ROOF RAILING FOR MOTOR VEHICLES

[75] Inventors: Karl-Heinz Lumpe, Wuppertal; Ulrich Rehm, Hagen; Klaus Kolodziej, Wuppertal; Ronald Grätz, Essen, all of Germany

[73] Assignee: Happich Fahrzeug-Dachsystems GmbH, Wuppertal, Germany

[21] Appl. No.: 08/654,795

[22] Filed: May 29, 1996

Related U.S. Application Data

[63] Continuation of application No. 08/346,782, Nov. 30, 1994, abandoned.

[30] Foreign Application Priority Data

Dec. 7, 1993 [DE] Germany .............. 43 41 619.5

[51] Int. Cl.$^6$ .................................................. B60R 9/04
[52] U.S. Cl. ...................... 224/309; 224/322; 224/326
[58] Field of Search ...................... 224/322, 309, 224/325, 326, 321; 410/101, 106

[56] References Cited

U.S. PATENT DOCUMENTS

| 3,623,642 | 11/1971 | Stephen | 224/325 |
| 4,156,497 | 5/1979 | Bott | 224/326 |
| 5,016,799 | 5/1991 | Stapleton | 224/326 |
| 5,069,377 | 12/1991 | Baughman | 224/321 |

FOREIGN PATENT DOCUMENTS

| 1578752 | 1/1968 | France. |
| 2946533 | 5/1981 | Germany. |
| 3629926 | 1/1988 | Germany. |
| 4004829 | 2/1992 | Germany. |

*Primary Examiner*—Linda J. Sholl
*Attorney, Agent, or Firm*—Ostrolenk, Faber, Gerb & Soffen, LLP

[57] ABSTRACT

A roof railing for motor vehicles which has a tubular rail extending spaced from and substantially parallel to the roof surface along a lateral roof frame. Two supports on the ends of the rail attach the roof railing to the roof of the vehicle. The rail is developed with a bend at each of its end regions. It also has free ends which extend parallel to the surface of the roof and rest on the roof. In the region of each bend, there extends below the rail a support which is fastened to the rail. On its top side, the support has a groove which surrounds a part of the circumference of the rail. Each support is fastened to the roof of the vehicle.

17 Claims, 3 Drawing Sheets

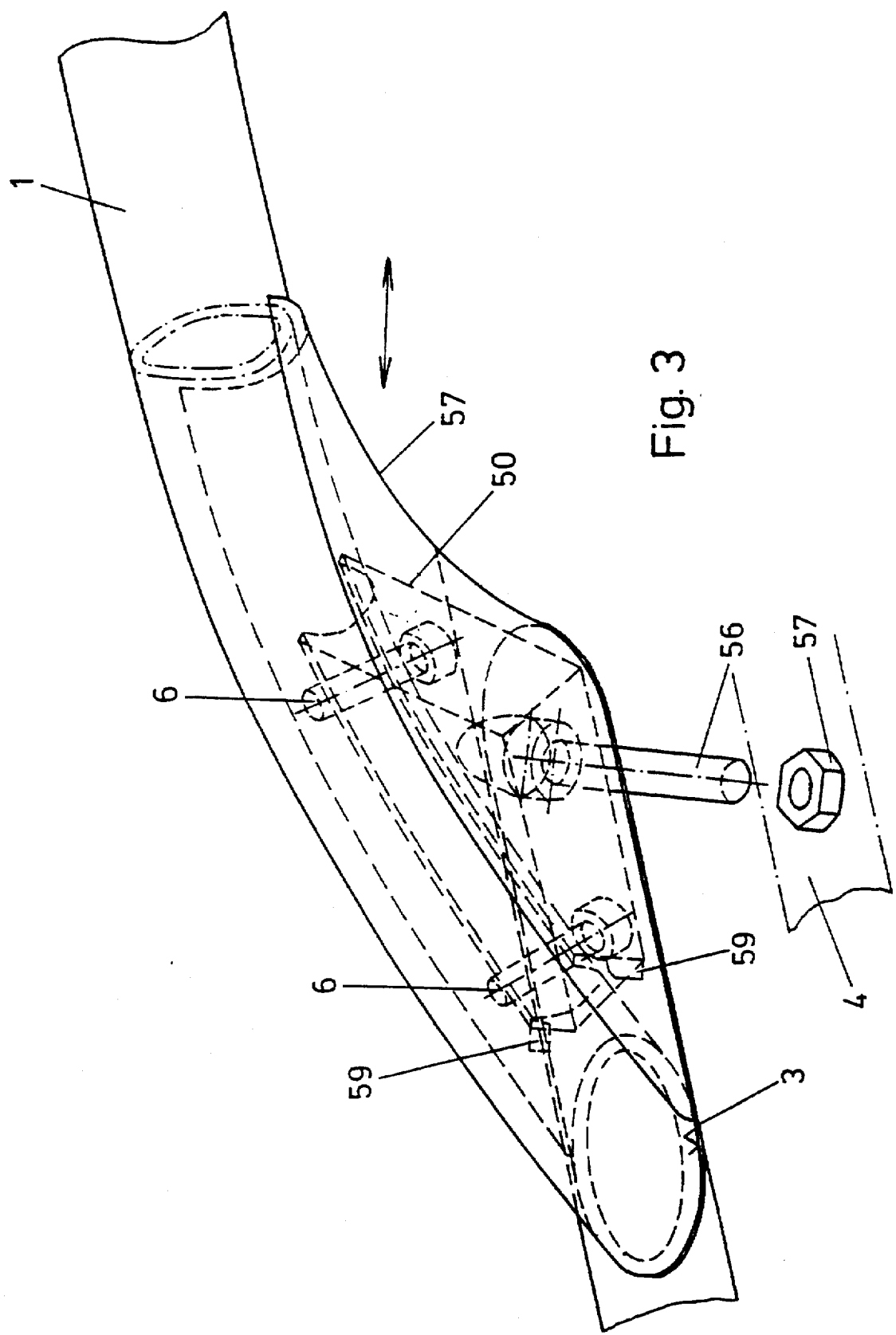

MOUNTING SUPPORT FOR ROOF RAILING FOR MOTOR VEHICLES

This is a continuation of application Ser. No. 08/346,782 filed on Nov. 30, 1994 now abandoned.

BACKGROUND OF THE INVENTION

The present invention relates to a roof railing for motor vehicles and particularly to mounting supports at the ends of the railing. A roof railing has a tubular rail which extends spaced from and substantially parallel to the surface of the roof along a lateral roof frame. There are two supports at the opposite ends of the rail for attaching the roof railing to the roof of the vehicle.

A roof railing of this type is known, for instance, from Federal Republic of Germany A 40 04 829 which discloses a roof railing generally comprised of a rail on each side of the roof and at least two support feet for supporting each rail. The support feet are usually developed as metal castings with pins which engage the ends of the rail. These pins are aesthetically unpleasant because in practice, a gap with respect to the rail is unavoidably formed, and the pins form transitions which decrease the load bearing capacity of the roof railing.

In the roof railing for motor vehicles disclosed in Federal Republic of Germany 29 46 533 A1, the rails have a bend at each of their end regions. The downwardly bent ends of the rails can be fastened by screws or the like to the roof plate of a motor vehicle. This generalized statement does not teach a person skilled in the art since it is not clear how a screw or the like is to be fastened in the open end of a tubular rail.

SUMMARY OF THE INVENTION

Proceeding from the above prior art roof railings, the primary object of the invention is to fasten a roof railing to a vehicle in a simple and reliable manner.

Another object of the present invention is to provide a roof railing which does not have a pin connection between the support and the rail and which, in particular, also has a high load carrying capacity.

In order to achieve this object of the invention, the rail has a bend or curve toward each of its end regions and the end regions terminate at free ends which extend parallel to the surface of the roof. In the region of each bend of the rail, a support, which is initially a separate element from the rail, is fastened to the rail and extends below the rail. On its top, the support has a groove shaped receptacle or recess which surrounds a part of the circumference of the rail and may conform to the shape of the rail. The support can, in turn, be fastened to the roof of the vehicle. While it is held in the support, the rail also rests on the roof at its end surfaces, whereby the support does not bear all of the stresses applied to the rail in use.

The invention provides a relatively simple and economically manufactured roof railing which is comprised essentially of a curved extruded profile member made of light weight metal which rests directly on the surface of the roof. The continuous, extruded profile member (the rail and its bends) conducts stress and forces directly into the roof. This avoids weakening at the previously customary transitions to the pins of conventional rail end supports and avoids the previous unaesthetic appearance of roof rails since the previously customary transitions are no longer present.

The rail with bends is fastened to the roof of the vehicle via supports. Each support has a lower support surface which rests on the roof of the vehicle and an upper resting surface for receiving the rail. The resting surface has a recess or it is concavely developed to conform to the corresponding shape and bend of the rail at its bend. The support is adapted to be screwed both to the roof of the vehicle and to the rail. Each support thus provides an adapter for fastening the actual roof railing, which merely comprises the curved rail, to the roof. Each support can further assume a decorative function which aesthetically upgrades the roof railing. This is particularly the case if each support is to be screwed in from the rail and also from below to the roof of the vehicle. A screw attachment from below has the advantage that the screw positions are at least substantially screened from view.

As another feature of the invention, which is frequently preferred, each support can be screwed in from below to the rail and from above to the roof of the vehicle. To screw in the supports from above, a screw is passed through a corresponding hole in the support and then is screwed into a nut, or the like, which is welded from below to the roof of the vehicle. This screw connection enables the roof railing to be rapidly and easily removed from the roof in the event of repainting. Screwing in the supports from above has the disadvantage that the screw in positions are visible.

A further feature of the invention eliminates the aesthetic disadvantage of a screw connection from above. Each support carries a cover cap which in its appearance forms a support foot and which rests on the corresponding bend of the rail. The cap has a U-shaped cross section with legs which extend parallel to the rail. The free ends of the cap are directed toward the corresponding end of the rail. A cover cap provides stylistic freedom in shaping. It also screens the screw in places from view and further makes it possible to use unfinished supports, i.e. supports which do not have to be subjected to a surface treatment such as grinding, polishing or the like, since the supports are completely enclosed by the cover caps.

Furthermore, the support may carry a cover cap which extends over the entire axial region of the bend of the rail. In this case, the cover cap is preferably developed as a plastic extrusion and furthermore, it has detent elements formed on it for attachment to one support. These measures contribute toward the simple economical production of the roof railing.

The invention provides a relatively simple, economically manufactured roof railing which is comprised essentially of a curved extruded profiled member formed of light metal which rests directly on the surface of the roof, and of the supports which are arranged in the region of the bends. This railing can be fastened rapidly, simply and dependably due to the presence of the supports.

Other features and advantages of the present invention will become apparent from the following description of the invention which refers to the accompanying drawings.

BRIEF DESCRIPTION OF THE DRAWINGS

FIG. 3 shows an end region of a second embodiment of the roof railing with a support and a cover cap arranged thereon;

DESCRIPTION OF EMBODIMENTS OF THE INVENTION

Figure 1:
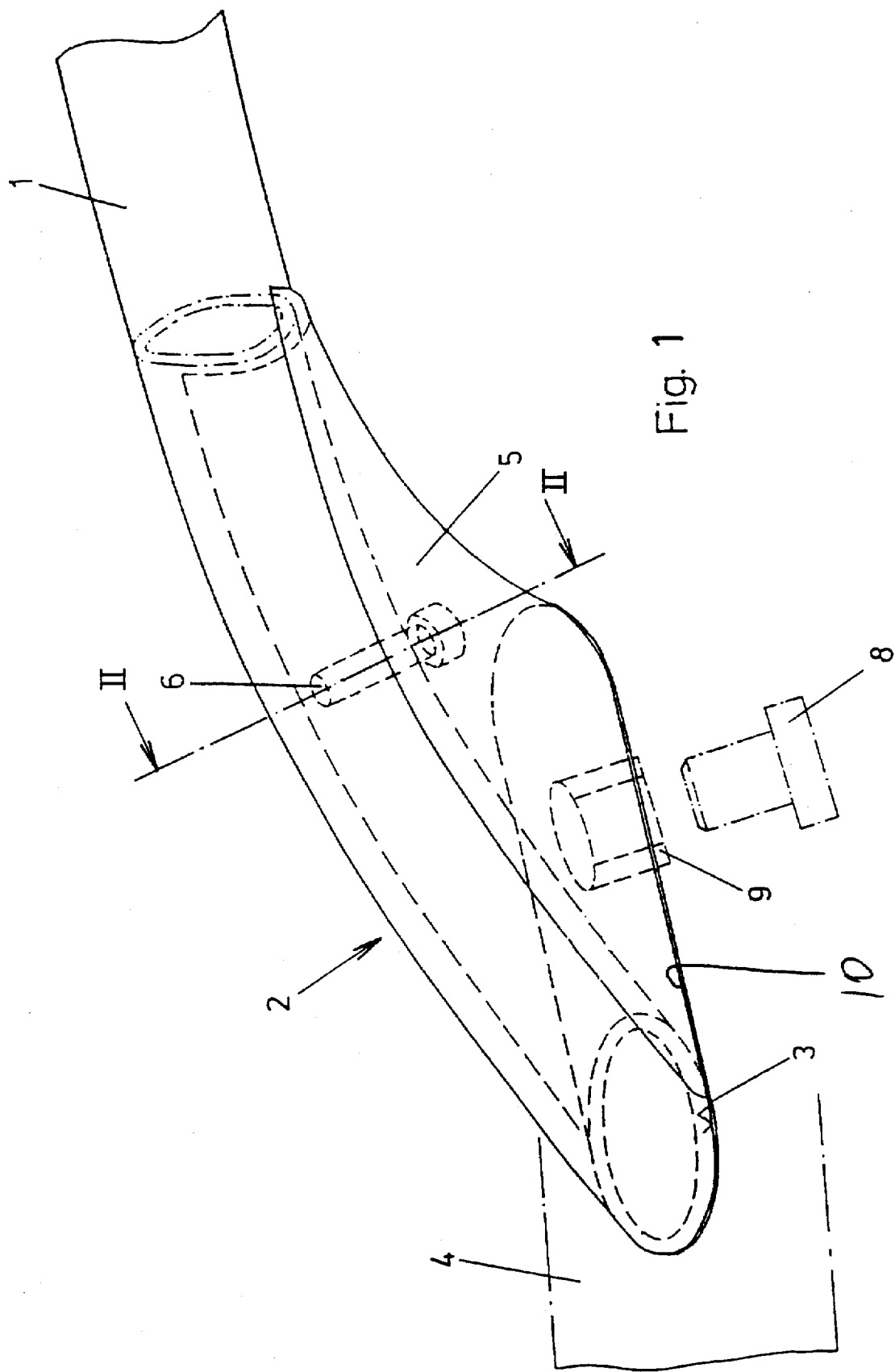
FIG. 1 shows an end region of a first embodiment of the roof railing and one of its supports.
Figure 2:
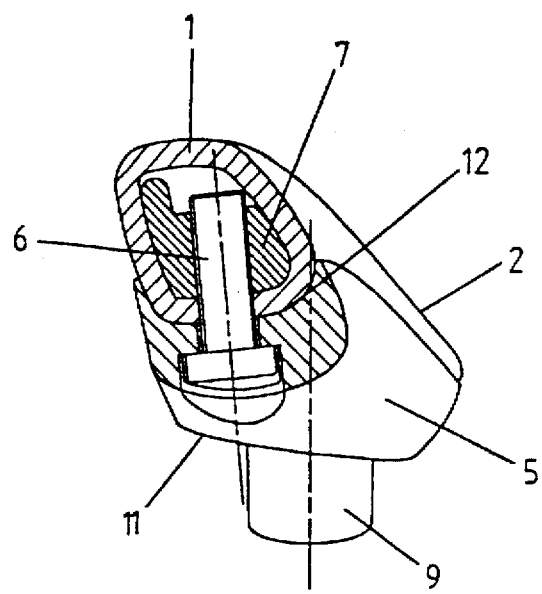
FIG. 2 is a cross-section of the railing approximately along the line II—II of FIG. 1.

The roof railing shown in FIGS. 1 and 2 is formed of a section of a tubular extruded profile having essentially the profile of a rail 1 with two end regions each developed with a bend 2. Only one of the bends and the ends 3 of the rail 1 is shown. It is machined so that the free end may rest flat on and parallel to the surface 4 of the roof of a motor vehicle (not shown). Therefore, the rail is directly supported on the roof in addition to being supported by the below described support 5. For attaching the rail 1 to the roof surface 4, a support 5 is screwed on each end of the rail, in the region of the bend 2. The screw attachment is from below into the rail 1 so that the place of screwing in is not readily visible.

The support 5, in turn, can be fastened from below to the roof of the vehicle, by means of a screw 8, indicated in dash-dot line in FIG. 1, which is passed through the roof plate. The screw 8 engages from below into a threaded hole in the support 5. This hole can also be provided in a dome 9 which is developed on the support 5 and engages into a roof channel (not shown in the drawing). The roof railing can be delivered with supports 5 premounted on the rail 1 and then it need merely be placed on the roof of the vehicle by the customer and be welded on the roof from below. It is advisable to provide an additional packing 10 in each case between the surface of the roof 4 and the support surface 11 of the supports 5.

As shown in FIGS. 1 and 2, the support 5 is a solid body having a lower support surface 11 which rests on the roof surface 4 and an upper support surface for the rail 1 in the region of the bend 2. The upper support surface is developed as a concave groove 12 or another receptacle shape which follows the corresponding shape of the underside of the bend 2.

Figure 4:
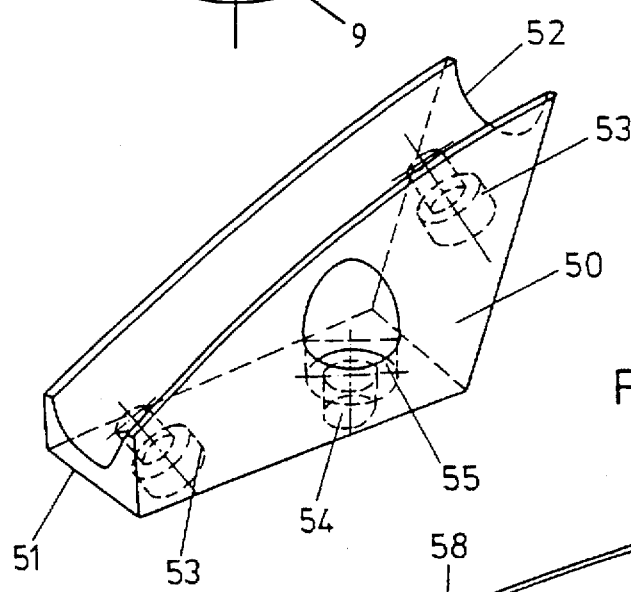
FIG. 4 is a view of the support of FIG. 3.
Figure 5:
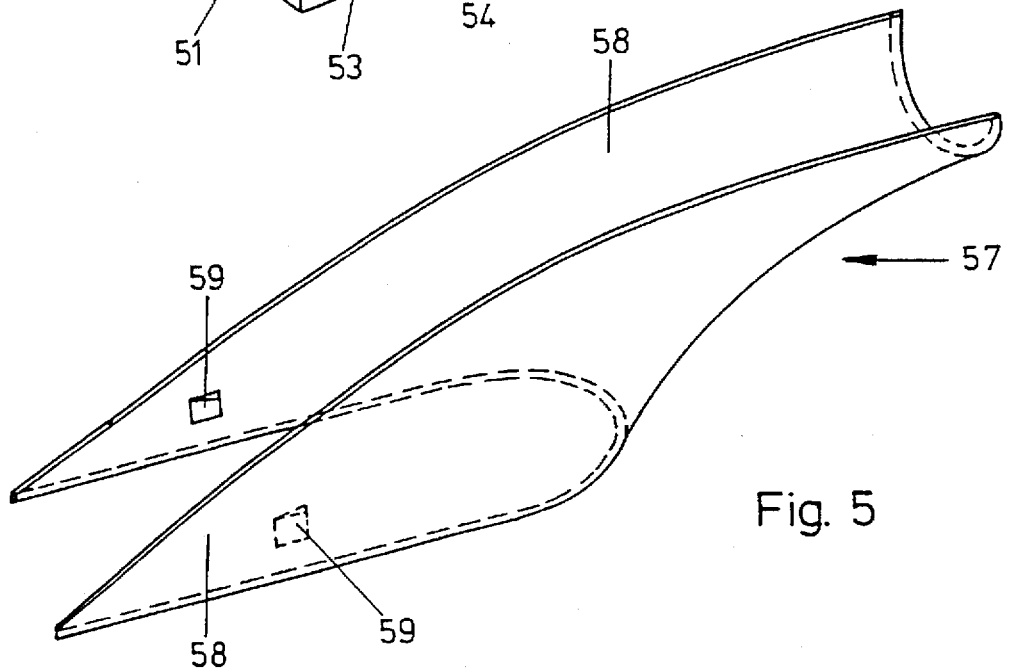
FIG. 5 is a view of the cover cap of FIG. 3.

In the second embodiment of a roof railing shown in FIGS. 3 to 5, there is also a rail 1 having two end regions, of which one is shown in FIG. 3. Each end region is provided with a bend 2. In this case also, the free ends of the rail 1 are so machined that they can rest flat and parallel on the roof surface 4.

For attaching the rail 1, an adapter in the form of a support 50 is employed. It is narrower than the diameter of the rail and is shorter in length than the axial length of the bend 2. The support 50 is also a solid body and has a lower support surface 51 which rests on the roof surface 4 and an upper support surface or receptacle in the form of a concave groove 52 for supporting part of the length of the rail 1 in the region of the bend 2. The support 50 is developed with stepped holes 53 for receiving screws 6 which engage the rail 1 or possibly threaded blocks arranged in the rail. Another hole 54 extends from a side wall of this support, forms a support surface 55 there, and passes through the support surface 51. The support surface 55 may be formed through the side walls of the support extending obliquely to the support surface 51 rather than perpendicularly thereto, since the rails 1 which are aligned parallel to each other are in general inclined toward each other on a vehicle roof.

The rail 1, which is provided with the bends 2, can be screwed to the adapters or supports 50 by the screws 6 before delivery. Upon final mounting of the rail, the preassembled unit is screwed by the screw 56 to the roof of the vehicle, whereby it is mounted and screwed in from above. To make this possible, a welded in place nut 57 is arranged below the roof surface 4.

In order to complete the railing, each support 50 is provided with a cover cap 57. The cover cap 57 is of U-shape with legs 58. The free ends of the legs 58 of the cap are adapted in contour to the bend 2 and rest on the rail 1. The cover cap 57 is preferably developed as a plastic extrusion and has detent elements 59 formed on it for attachment to the support 50.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A roof railing for application to the roof of a motor vehicle, the railing comprising:

a tubular rail having a central portion which is adapted to extend substantially parallel to the surface of the roof, the rail having end regions beyond the central portion, each end region of the rail having a bend shaped for supporting the central portion of the rail spaced above the roof, and outward past the respective bend, each end region of the rail terminating at a free end which is adapted to rest directly on the roof surface; and a respective support on each end region of the rail for supporting the central portion of the rail spaced from the surface of the roof and for attaching the rail to the roof, the respective support at the end region of the rail being disposed below the rail generally at the bend, the support including a lower support surface for resting on the roof of the vehicle and a top receptacle receiving a part of the circumference of the rail generally at the bend, and the support being fastenable to the roof of the vehicle, wherein the rail is received in the top receptacle such that at least a portion of the free end is flush with the lower support surface.

2. The roof railing of claim 1, wherein the free end of the rail is shaped to co-extend with and to rest along the surface of the roof.

3. The roof railing of claim 1, wherein the receptacle in the support for the rail comprises a groove in the support in which the rail is received.

4. The roof railing of claim 3, wherein the groove in the support is shaped to surround a part of the circumference of the rail.

5. The roof railing of claim 4, wherein the groove is concavely shaped to follow the shape of the corresponding bend of the rail.

6. The roof railing of claim 4, wherein the support has a lower support surface which rests on the roof of the vehicle and has an upper resting surface in which the groove is formed.

7. The roof railing of claim 6, wherein means are provided for screwing the support to the roof of the vehicle and for screwing the support to the rail.

8. The roof railing of claim 1, further comprising first attachment means for attaching the support to the roof of the vehicle and second attachment means for attaching the support to the rail.

9. The roof railing of claim 8, wherein the first attachment means comprises first means for screwing the support to the roof of the vehicle and the second attachment means comprises second means for screwing the rail to the support.

10. The roof railing of claim 9, wherein the first means for screwing comprises a first screw extending from below the support to the roof of the vehicle; and the second means for screwing comprises a second screw extending from the support from below the rail end to the rail.

11. The roof railing of claim 9, wherein the first means for screwing comprises a connection from above in the support to the roof of the vehicle; and the second means for screwing comprises a second screw extending from the support from below the rail end to the rail.

12. The roof railing of claim 9, further comprising a cover cap generally on the sides of the support and shaped to visually define a support foot for the rail, the cover cap being shaped to rest on and below the bend of the rail;

the cover cap having a generally U-shaped cross section including legs which extend parallel to and along the sides of the rail.

13. The roof railing of claim 12, wherein the legs of the cover cap have free ends which are contoured generally to the corresponding end of the rail.

14. The roof railing of claim 8, further comprising a cover cap which extends over the bend of the rail and the cover cap being supported on the respective support.

15. The roof railing of claim 6, further comprising a cover cap which extends over the bend of the rail and the cover cap being supported on the respective support.

16. The roof railing of claim 15, wherein the cover cap comprises a plastic extrusion including detent elements thereon for attachment to the respective support.

17. The roof railing of claim 1, further comprising a cover cap which extends over the bend of the rail and the cover cap being supported on the respective support.

* * * * *

UNITED STATES PATENT AND TRADEMARK OFFICE
CERTIFICATE OF CORRECTION

PATENT NO. : 5,893,499
DATED : April 13, 1999
INVENTOR(S) : Karl-Heinz Lumpe et al.

It is certified that error appears in the above-identified patent and that said Letters Patent is hereby corrected as shown below:

On the title page, item [73] should read:

[73] Assignee: Happich Fahrzeug-Dachsysteme GmbH
Wuppertal, Germany

Signed and Sealed this

Twenty-eighth Day of September, 1999

Attest:

Q. TODD DICKINSON

*Attesting Officer*      *Acting Commissioner of Patents and Trademarks*